(12) United States Patent
Darby

(10) Patent No.: US 6,863,198 B1
(45) Date of Patent: Mar. 8, 2005

(54) PROPANE TANK TRANSPORT DEVICE

(76) Inventor: Richard Wyland Darby, 2419 Cottage Dr., Auburn, CA (US) 95603

( * ) Notice: Subject to any disclaimer, the term of this patent is extended or adjusted under 35 U.S.C. 154(b) by 132 days.

(21) Appl. No.: 10/172,608

(22) Filed: Jun. 14, 2002

(51) Int. Cl.⁷ .................................................. B60R 9/00
(52) U.S. Cl. ...................... 224/403; 224/497; 224/511; 224/532; 224/536; 224/547; 224/549; 224/558; 224/570
(58) Field of Search ................................ 224/401, 403, 224/497, 511, 531, 532, 533, 536, 545, 547, 549, 558, 565, 567, 570; 280/769, 830, 834; 248/310, 313, 311.2; 211/85.18

(56) References Cited

U.S. PATENT DOCUMENTS

| | | | | |
|---|---|---|---|---|
| 1,639,563 A | * | 8/1927 | Hays .......................... | 224/42.39 |
| 1,994,338 A | * | 3/1935 | Endacott ..................... | 280/834 |
| 2,538,704 A | * | 1/1951 | Pole, Jr. ...................... | 280/830 |
| 3,753,543 A | * | 8/1973 | Burrell et al. ............... | 248/313 |
| 3,791,403 A | * | 2/1974 | Folkerth ...................... | 248/313 |
| 4,848,714 A | * | 7/1989 | Ziaylek et al. ............... | 248/313 |
| 4,860,986 A | * | 8/1989 | Couzens ...................... | 248/313 |
| 5,025,935 A | * | 6/1991 | Hadachek .................. | 211/85.18 |
| 5,328,143 A | * | 7/1994 | Koorey et al. .............. | 248/311.2 |
| 5,560,576 A | * | 10/1996 | Cargill ........................ | 224/403 |
| 5,799,849 A | * | 9/1998 | Beer et al. ................... | 224/403 |
| 5,806,892 A | * | 9/1998 | Colburn ...................... | 280/834 |
| 6,129,252 A | * | 10/2000 | Jackson et al. .............. | 224/545 |

* cited by examiner

*Primary Examiner*—Gary E. Elkins
(74) *Attorney, Agent, or Firm*—Risto A. Rinne, Jr.

(57) ABSTRACT

An apparatus for the transport of a propane tank for filling includes a clamp assembly that is adapted for attachment to a portion of a sidewall of a pickup truck. A removable assembly is detachably-attachable with respect to the clamp assembly. The removable assembly includes a pivoting plate that is adapted to receive a bottom of a propane tank thereon, and a band assembly that is adapted to secure an upper portion of the propane tank. The pivoting plate is adapted to pivot upward for storage and the band assembly is adapted to pivot downward for storage.

8 Claims, 1 Drawing Sheet

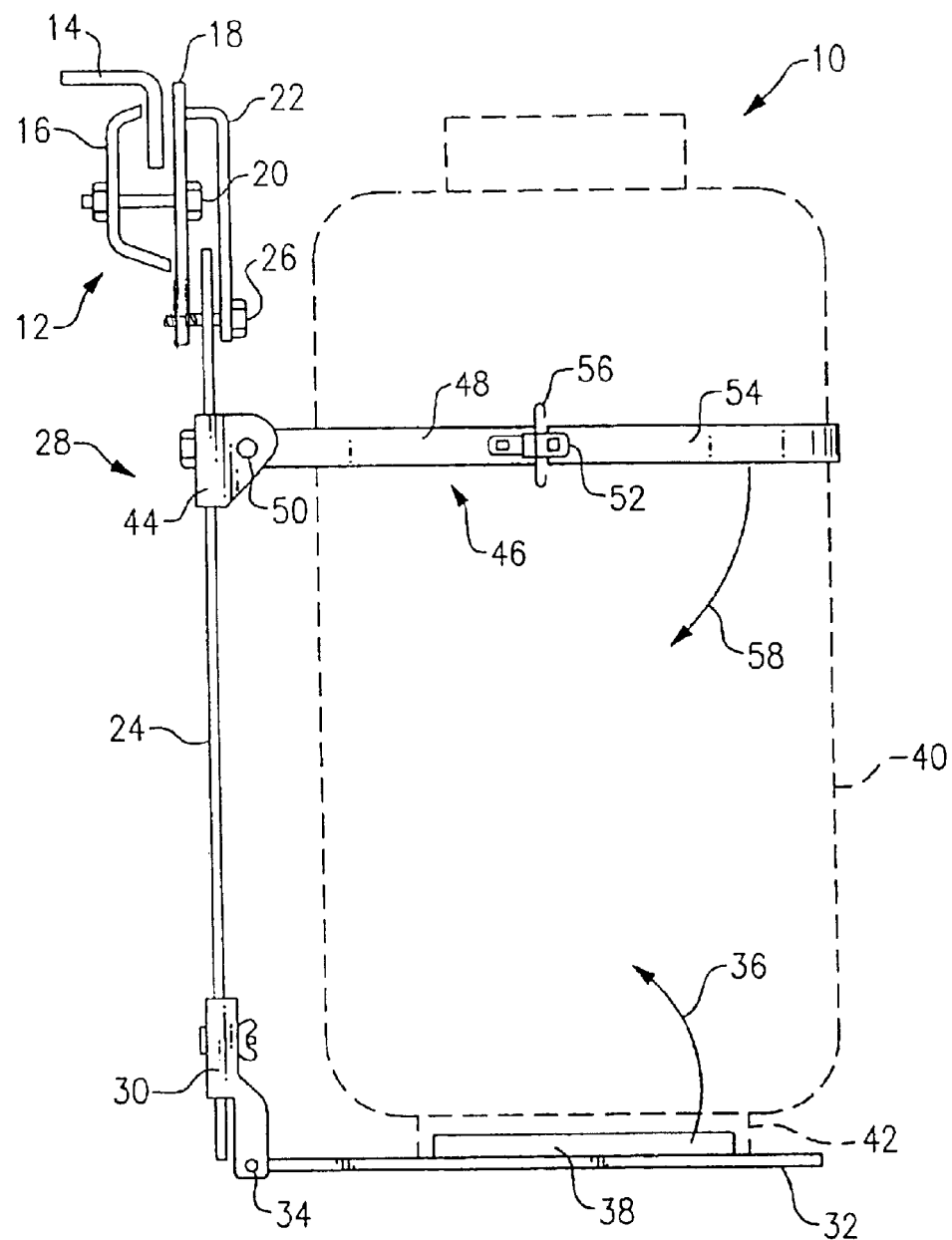

PROPANE TANK TRANSPORT DEVICE

BACKGROUND OF THE INVENTION

1. Field of the Invention

The present invention, in general relates to propane tanks and, more particularly, to devices that secure a propane tank in position during transportation of the tank.

Propane tanks are well known types of devices that come in a variety of sizes, depending upon the purpose involved. For example, there are small disposable propane tanks that are used for camping and similar purposes. These small disposable propane tanks are purchased full, used once, and then discarded.

At the opposite end of the spectrum are larger propane tanks that are used for residential and commercial purposes. These larger tanks are normally delivered, set up at a particular location, and are not moved during their useful life. When additional propane is required, a truck comes to deliver propane to the tank and fills the tank by use of a hose.

In between these two extremes are a variety of refillable propane tanks that are generally transported to a fill location, for example to a propane dealer or to a gas station that sells liquid propane.

These medium sized refillable tanks are utilized for a great many purposes including, for example, supplying propane for use in gas barbecues, recreational vehicles such as travel trailers and motorhomes, and also to power certain vehicles, such as fork lifts.

These types of medium sized refillable tanks include several sizes or capacities that are measured in either the number gallons of propane or pounds of propane that they hold. These types of tanks typically hold between about one and twelve gallons of propane with a range of from two to seven gallons being the most popular sizes.

These various sized tanks tend to have the same or very nearly the same diameter while varying primarily in height, the taller versions having of course a greater capacity.

These medium sized refillable tanks must be transported from the barbecue or travel trailer to the filling location and then back again. Once filled, they tend to be heavy. Most people place these tanks in the bed of a pickup, possibly wedging other items around them to secure them in position.

However, when either accelerating or braking, they tend to fall over and in emergency (i.e., hard) braking situation or in crashes, they can become missiles that pose a substantial risk to others.

They are heavy, and their weight can due to impact severely injure or kill the driver or passengers of the vehicle. They can be hurled from the vehicle during emergency braking, hard cornering, or crashes and can impact with those outside the transport vehicle.

But the greatest danger is that they can explode. Some of them may leak small a small quantity of propane. Over time, the propane can accumulate and any type of a spark can then ignite the propane. If enough propane has accumulated, an explosion or fire can occur.

During crashes, these refillable propane tanks have been known to explode, becoming much like bombs. While many people seem unaware of the risks, they are dangerous to transport for filling.

No effective known solution exists that can be used to transport a propane tank for filling of the tank that is adapted to secure the tank in position in the bed of a pickup (or in a utility trailer) and which is adapted to hold a variety of sizes of tanks.

One possible reason why no such devices have been created that have found widespread use is because any such device would be in the way, taking up valuable space in the bed of the pickup truck when not in use. This wasted space has heretobefore been unavoidable, because any device that can secure a propane tank must grasp the tank in some fashion, and that mechanism would encroach upon the available space in the bed of the pickup truck.

Also, there are so many sizes of these propane tanks that are available, it is difficult to accommodate them all. Even if various devices were designed to fit a particular size of tank, this too poses a problem to a person who owns a recreational vehicle with a standard size of propane tank, installs such a device and then later upgrades to a larger size of propane tank.

Furthermore, the device must be strong enough to secure a heavy filled tank in position during hard braking, acceleration, and cornering, and also during moderate level crashes.

Also, such a device must be easy to use. If the user is required to lift heavy, filled bottles of propane high into the air in order to use the device (i.e., to insert or remove the tanks), it would have limited consumer appeal.

Lastly, most owners of pickups do not want to damage their pickup beds by having to drill holes in the bed to secure such a device in position.

Accordingly, there exists today a need for a method and system for a propane tank transport device that is safe, secure, easy to use, and which is adapted to secure a variety of sizes of propane tanks to a bed of a pickup.

Clearly, such an apparatus would be a useful and desirable device.

2. Description of Prior Art

Devices that hold propane tanks to vehicles for use of the propane are, in general, known. While the structural arrangements of the above described devices, at first appearance, may have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a propane tank transport device that is safe to use.

It is also an important object of the invention to provide a propane tank transport device that is adapted to securely hold a propane tank for transport when empty and when it has been filled.

Another object of the invention is to provide a propane tank transport device that is adapted to secure different sizes of refillable propane tanks to either a bed of a pickup truck or to the side wall of a travel trailer.

Still another object of the invention is to provide a propane tank transport device that is readily removable apart from a bed of a pickup truck.

Still yet another object of the invention is to provide a propane tank transport device that folds for compact storage, either when disposed in the bed of a pickup truck or if it is removed apart from the bed.

Yet another important object of the invention is to provide a propane tank transport device that is adapted to separate into at least two assemblies, one assembly being removable apart from a bed of a pickup truck and the remaining assembly remaining attached to the pickup truck bed.

Still yet another important object of the invention is to provide a propane tank transport device that secures a propane tank in two locations, first at the bottom of the tank and second, around its circumference at an elevated location disposed above the bottom of the tank.

Briefly, a propane tank transport device that is constructed in accordance with the principles of the present invention has a clamp assembly that is adapted for attachment to the sidewall of a pickup truck. The clamp assembly is adapted to receive a removable assembly. The removable assembly is detachable apart from the clamp assembly and it includes a ring that is attached to a plate which is disposed at an elevation that is disposed slightly above the plane of the bed. The ring is adapted to secure a bottom of a propane tank that is placed over it. The bottom of the propane tank includes a round lip that surrounds the ring. A band that is disposed above the ring is attached to the removable assembly. The band preferably includes a hinge and a latch for opening and closing around the tank. The band and the plate are preferably hinged with respect to a vertical member of the removable assembly from a first extended position that is adapted for use into a second retracted position that is adapted for storage of the device when it is not in use.

BRIEF DESCRIPTION OF THE DRAWING

The FIGURE is a cross sectional view of the clamp assembly attached to a sidewall of a bed of a pickup truck and a removable assembly that is attached to the clamp assembly.

DETAILED DESCRIPTION OF THE INVENTION

Referring to the FIGURE is shown, a propane tank transport device, identified in general by the reference numeral 10.

A clamp assembly 12 is adapted for attachment to a an interior sidewall 14 of a pickup truck. A rear member 16 is disposed behind the sidewall 14 and a front member 18 is disposed in front of the sidewall 14. A pair of bolts 20 (one shown) pass through the front member 18 and the rear member 16 and are tightened to draw the front and rear members 18, 16 toward each other sufficient to pinch the sidewall 14 therebetween.

A pair of planar parallel oppositely disposed edge members 22 extend in a perpendicular attitude away from the front member 18.

A vertical member 24 is disposed between the pair of edge members 22 and the front member 18 sufficient to prevent side to side motion thereof. The vertical member 24 is detachably-attached to the front member 18 by an engagement bolt 26 that passes through the vertical member 24 and engages a threaded hole in the front member 18. The engagement bolt 26 is removed to remove the vertical member 24 apart from the front member 18.

Other component parts, as are described in greater detail hereinafter, are also attached to the vertical member 24 and, when taken together, form a removable assembly, identified in general by the reference numeral 28.

If a user (not shown) requires the fullest use of the space in the pickup, the removable assembly 28 is removed and a nearly unobstructed bed is provided.

A lower hinge bracket 30 is attached to the vertical member 24 proximate an opposite second end of the vertical member 24.

A substantially round planar plate 32 is hingedly attached about a first axis 34 and is adapted to pivot from a first extended position (as shown) that is adapted for use into a second retracted position as indicated by arrow 36 where a distal end of the plate 32 is disposed up and proximate the vertical member 24.

A round ring 38 is attached to an upper surface of the plate 32 when the plate is disposed in the first position. A propane tank 40 is shown in dashed lines and it includes a lower round lip 42 that is adapted to fit over the ring 38 when the tank 40 is disposed on top of the plate 32.

An upper hinged bracket 44 is disposed a predetermined distance above the lower bracket 34 and is similarly attached to the vertical member 24.

A band assembly 46 is attached to the upper bracket 44 at each end thereof. The band assembly 46 includes a first arcuate member 48 that is hingedly attached about a second axis 50 and which extends from the upper bracket 44 for approximately one-quarter of the circumference of the propane tank 40.

The first arcuate member 48 terminates in a Latch assembly 52 and is connected to a second arcuate member 54 that extends for approximately one-half of the circumference of the propane tank 40.

The remaining end of the second arcuate member 54 terminates at a vertical hinge 56. The vertical hinge 56 includes a pivot axis that is perpendicular with respect to that of either the first axis 34 or the second axis 50, both of which are parallel with respect to each other.

A third arcuate member (not shown) is disposed behind the first arcuate member 48. One end of the third arcuate member is attached to the upper bracket 44 and the remaining end is attached to the vertical hinge 56.

In use, the latch assembly 52 is opened and the second arcuate member 54 is pivoted about the vertical hinge 56 into an open position. The length of the vertical member 24 is provided and adjusted so that the first axis 34 is disposed slightly above the floor of the bed of the pickup.

When the plate 32 is disposed in the first extended position, the plate 32 is resting on, or just slightly above, the floor of the bed.

The tank 40 is placed on the plate 32 with the lip 42 over the ring 38. This ensures that the bottom of the tank 40 cannot move laterally.

The second arcuate member 54 is pivoted around the tank 40 and is secured in a closed position by the latch assembly 52. This ensures that the top of the tank 40 cannot move laterally. Accordingly, the tank 40 is adapted for transport for filling.

To remove the tank 40, the procedure is reversed and the tank 40 is removed. The band assembly 46 is then closed and latched.

Accordingly, the tank 40 does not have to be lifted any more than the height of the ring 38.

When the tank 40 is removed, the band assembly 46 is pivoted downward as shown by arrow 58 and the plate 32 is pivoted upward to provide substantial cargo volume in the bed. If maximum space is required, the removable assembly 28 is detached from the clamp assembly.

The component parts of the propane tank transport device 10 are preferably made of any suitably strong material (or materials), for example, steel.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A propane tank transport device, comprising:
   (a) means adapted for securing said propane tank to said device; and
   (b) means for attaching said device to a vehicle when said propane tank is not adapted for use, and wherein said means adapted for securing includes a removable assembly, said removable assembly adapted for attachment to and removal apart from said means for attaching and wherein said removable assembly includes a vertical member, and wherein said removable assembly includes a lower plate that is pivotally attached about a first axis to a lower bracket, said lower bracket attached to a lower end of said vertical member.

2. The propane tank transport device of claim 1 wherein said lower plate includes a ring attached to a surface thereof, said ring adapted for insertion into a lip that is disposed at a bottom of said propane tank and wherein said ring is adapted to secure a bottom of said propane tank.

3. The propane tank transport device of claim 2 wherein said lower plate is adapted to pivot from a first extended position that is adapted for use into a second retracted position that is adapted for transport.

4. The propane tank transport device of claim 1 wherein said removable assembly includes an upper bracket that is attached to said vertical member.

5. The propane tank transport device of claim 4 including a band assembly that is pivotally attached to said upper bracket and wherein said band assembly is adapted to pivot from a first extended position that is adapted for use into a second retracted position that is adapted for transport.

6. The propane tank transport device of claim 5 wherein said band assembly includes a first arcuate member, a second arcuate member, and a third arcuate member and wherein a first end of said first arcuate member is attached to said upper bracket, and wherein a second end of said first arcuate member is attached to a latch assembly, and wherein a first end of said second arcuate member is attached to said latch assembly, and wherein a second end of said second arcuate member is attached to a vertical hinge, and wherein a first end of said third arcuate member is attached to said hinge, and wherein a second end of said third arcuate member is attached to said upper bracket, and wherein said band assembly is adapted to secure an upper end of said propane tank.

7. The propane tank transport device of claim 1 wherein said means for attaching said device to a vehicle includes a clamp assembly.

8. The propane tank transport device of claim 7 wherein said clamp assembly includes a rear member and a front member, and wherein a portion of a sidewall of a pickup truck is adapted to be disposed between said front member and said rear member, and including means for urging said rear member toward said front member sufficient to retain said portion of said sidewall therein.

* * * * *